United States Patent
Callaway et al.

(10) Patent No.: US 6,446,071 B1
(45) Date of Patent: Sep. 3, 2002

(54) METHOD AND SYSTEM FOR USER-SPECIFIC MANAGEMENT OF APPLICATIONS IN A HETEROGENEOUS SERVER ENVIRONMENT

(75) Inventors: Janet Roberts Callaway; Denise Ann Morganti; David Michael Reichek; Stanley Alan Smith, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,951

(22) Filed: Apr. 26, 1999

(51) Int. Cl.[7] .............................................. G06F 17/30
(52) U.S. Cl. .............................................. 707/10; 707/9
(58) Field of Search .............................. 707/9, 10, 200; 709/220; 713/100, 201; 712/11

(56) References Cited

U.S. PATENT DOCUMENTS

| | | | | |
|---|---|---|---|---|
| 6,061,795 A | * | 5/2000 | Dircks et al. | 713/201 |
| 6,144,959 A | * | 11/2000 | Anderson et al. | 707/9 |
| 6,205,476 B1 | * | 3/2001 | Hayes, Jr. | 709/220 |
| 9,237,092 | * | 5/2001 | Hayes, Jr. | 713/100 |
| 2001/0011341 A1 | * | 8/2001 | Hayes, Jr. et al. | 712/11 |

* cited by examiner

Primary Examiner—Diane D. Mizrahi
(74) Attorney, Agent, or Firm—Duke W. Yee; Jeffrey S. LaBaw; Christopher P. O'Hagan

(57) ABSTRACT

A method and system for user-specific management of applications in a heterogeneous server environment is provided. A user may be assigned access to an application, and a user-application definition linking the selected user and the selected application is associatively stored with applications files for the selected application in a datastore on a heterogeneous server. The user-application definition may provide manageability of an application for a user of a Windows-based data processing system from a non-Windows-based server. The user-application definition may also be associatively stored with an application package that comprises user files, system files, user registries, or system registries that are used to configure a client for executing the application. The client may be configured by serving a Windows-based application specified by the user-application definition in the datastore from a non-Windows-based server to a Windows-based client.

19 Claims, 14 Drawing Sheets

METHOD AND SYSTEM FOR USER-SPECIFIC MANAGEMENT OF APPLICATIONS IN A HETEROGENEOUS SERVER ENVIRONMENT

CROSS REFERENCE TO RELATED APPLICATIONS

The present invention is related to applications entitled METHOD AND APPARATUS TO UPDATE A WINDOWS REGISTRY FROM A HETEROGENEOUS SERVER, Ser. No. 09/299,939, now U.S. Pat. No. 6,347,331; METHOD AND APPARATUS FOR DYNAMIC DISTRIBUTION OF SYSTEM FILE AND SYSTEM REGISTRY CHANGES IN A DISTRIBUTED DATA PROCESSING SYSTEM, pending U.S. application Ser. No. 09/299,936, METHOD AND SYSTEM FOR MANAGING WINDOWS DESKTOPS IN A HETEROGENEOUS SERVER ENVIRONMENT, pending U.S. application Ser. No. 09/299,937, METHOD AND SYSTEM FOR MANAGING WINDOWS APPLICATIONS IN A HETEROGENEOUS SERVER ENVIRONMENT, pending U.S. application Ser. No. 09/299,950; and METHOD AND SYSTEM FOR CAPTURING AND STORING SYSTEM CHANGES FOR APPLICATION TO MULTIPLE USERS AND SYSTEMS IN A HETEROGENEOUS SERVER ENVIRONMENT, pending U.S. application Ser. No. 09/299,952; all of which are filed even date hereof, assigned to the same assignee, and incorporated herein by reference.

BACKGROUND OF THE INVENTION

1. Technical Field

The present invention relates generally to an improved distributed data processing system and, in particular, to a method and data processing system for providing administrative management for customizable user environments within a distributed data processing system.

2. Description of Related Art

In distributed data processing systems, the client-server model is a well-known environment. In this model, the user of a computer utilizes a "client" system. The client system runs any of a number of computer operating systems to manage the basic functions that users execute, such as accessing files, executing programs, and system administration, as well as to serve as the base against which programs are written. Well-known client operating systems include Microsoft Windows 3.1, Windows for Workgroups, Windows 95, IBM® OS/2® Warp, Apple Macintosh, DOS, many variations of UNIX, and Microsoft Windows NT. The client system serves as the user's workstation, and it may execute programs as well as store some user data.

The server system can also run any of a number of computer operating systems. Well-known server operating systems include, for example, Novell Netware, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

The client-server model continues to evolve to meet the need for distributed resources. As personal computers have gained more functionality and reliability, end-users have improved their productivity through the use of a variety of distributed computing resources. While some enterprise data and legacy applications continue to be placed on reliable mainframe platforms, the need for distributed enterprise access to large numbers of applications and large amounts of data continues to grow.

Operating systems and computing hardware platforms have proliferated, and each combination of computer hardware and software addresses the need for a variety of price, performance, legacy compatibility, and features. Traditional PCs, such as desktop and laptop PCs, are designed to offer highly sophisticated end-user environments. The installation of workgroup computing software and complete application suites requires a computer with significant local storage and local networking capabilities. Network computers (NCs), on the other hand, offer a different type of versatility as they may provide limited access to Java™ and Windows™-based applications. NCs are typically implemented with only a general purpose processor, a system memory, and a communications port. Therefore, NCs typically rely upon network access to provide dynamic, non-volatile data storage capability.

Each of the various implementations of the client-server model has advantages and disadvantages. Networked PCs have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PCs retain some semblance of a standard configuration. Many operating systems provide various levels of system administration capabilities for accomplishing such administrative tasks. However, as users become more technically sophisticated through everyday use of various computing devices, users demand more options in their access to data and to computing resources. For example, people who travel extensively or work at various locations may rely on the ability to have access to a common set of applications wherever they are located. Enormous costs and amounts of time may be spent in accommodating user preferences while pursuing corporate directives for the use of standard configurations.

Industry standards have been developed for both critical and common functions to aid in the implementation of a system containing different types of client systems accessing different types of server systems. The use of these standards on the client and server afford users the opportunity to carry out functions in a consistent manner on a variety of common client and server operating systems, thereby reducing administrative costs. For example, one of the activities that has been standardized is the "authentication" of users. Authentication refers to the process in which a user is validated as being able to complete a logon and/or access a system. Standard protocols have been defined within the X/Open Server Message Block (SMB) specification and the Open Systems Foundation (OSF) Distributed Computing Environment (DCE) specification. While many products and operating systems have been developed that utilize standard protocols, not all products have used the standards. Hence, enterprises confront the difficult challenge of cost-effectively maintaining system administrative knowledge of enterprise-wide computer configurations while allowing some amount of user-specific configuration flexibility within a variety of operating systems that use non-standard protocols and data file formats.

Windows-based applications using the Win32 API's are dominant applications today. These applications are executed on Windows workstations or workstations that support the Win32 APIs in some form, yet many enterprises also use non-Window servers. In today's server-based environments, it is desirable to manage all users, applications, and data from a centralized location.

Thus, it would be advantageous to have an improved method and system for managing Windows applications in a non-Windows-based server environment.

SUMMARY OF THE INVENTION

The mechanism provides for a method and system for user-specific management of applications in a heterogeneous server environment. A user may be assigned access to an application, and a user-application definition linking the selected user and the selected application is associatively stored with applications files for the selected application in a datastore on a heterogeneous server. The user-application definition may provide manageability of an application for a user of a Windows-based data processing system from a non-Windows-based server. The user-application definition may also be associatively stored with an application package that comprises user files, system files, user registries, or system registries that are used to configure a client for executing the application. The client may be configured by serving a Windows-based application specified by the user-application definition in the datastore from a non-Windows-based server to a Windows-based client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
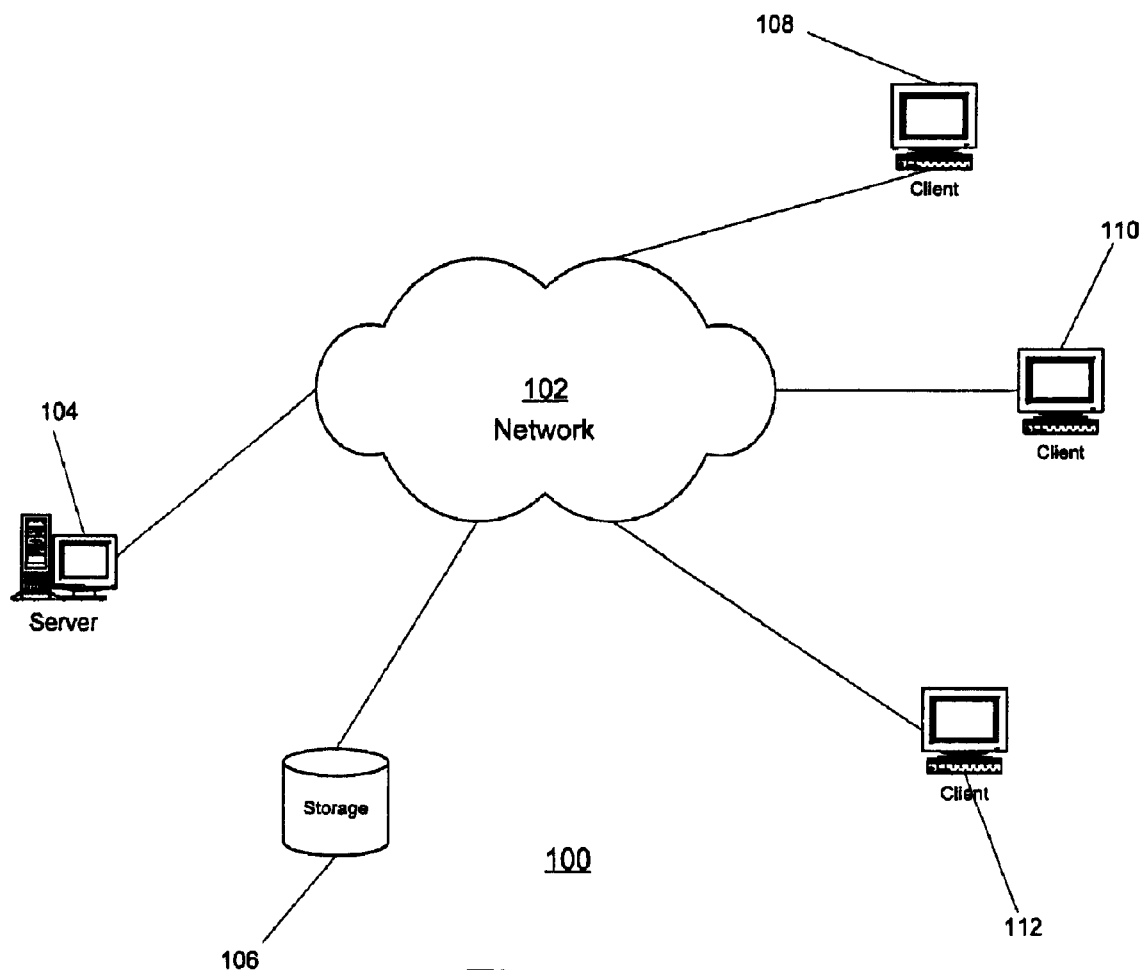
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

A client running the same operating system as the server is said to be "native," whereas a client running a different operating system from the server is said to be "non-native." Given a Microsoft Windows NT client, examples of non-native servers may include, without limitation, IBM OS/2 Warp Server, IBM LAN Server, other types of Server Message Block (SMB) servers, as well as operating systems that run Open Systems Foundation (OSF) Distributed Computing Environment (DCE) software. An example of the latter is a DCE Cell running Distributed File System (DFS).

The term "homogenous" is commonly used to describe an environment in which the operating system of the client and the operating system of the server that is accessed by the client are the same. The term "heterogeneous" is commonly used to describe an environment in which the client operating system and the server operating system are different.

Figure 2:
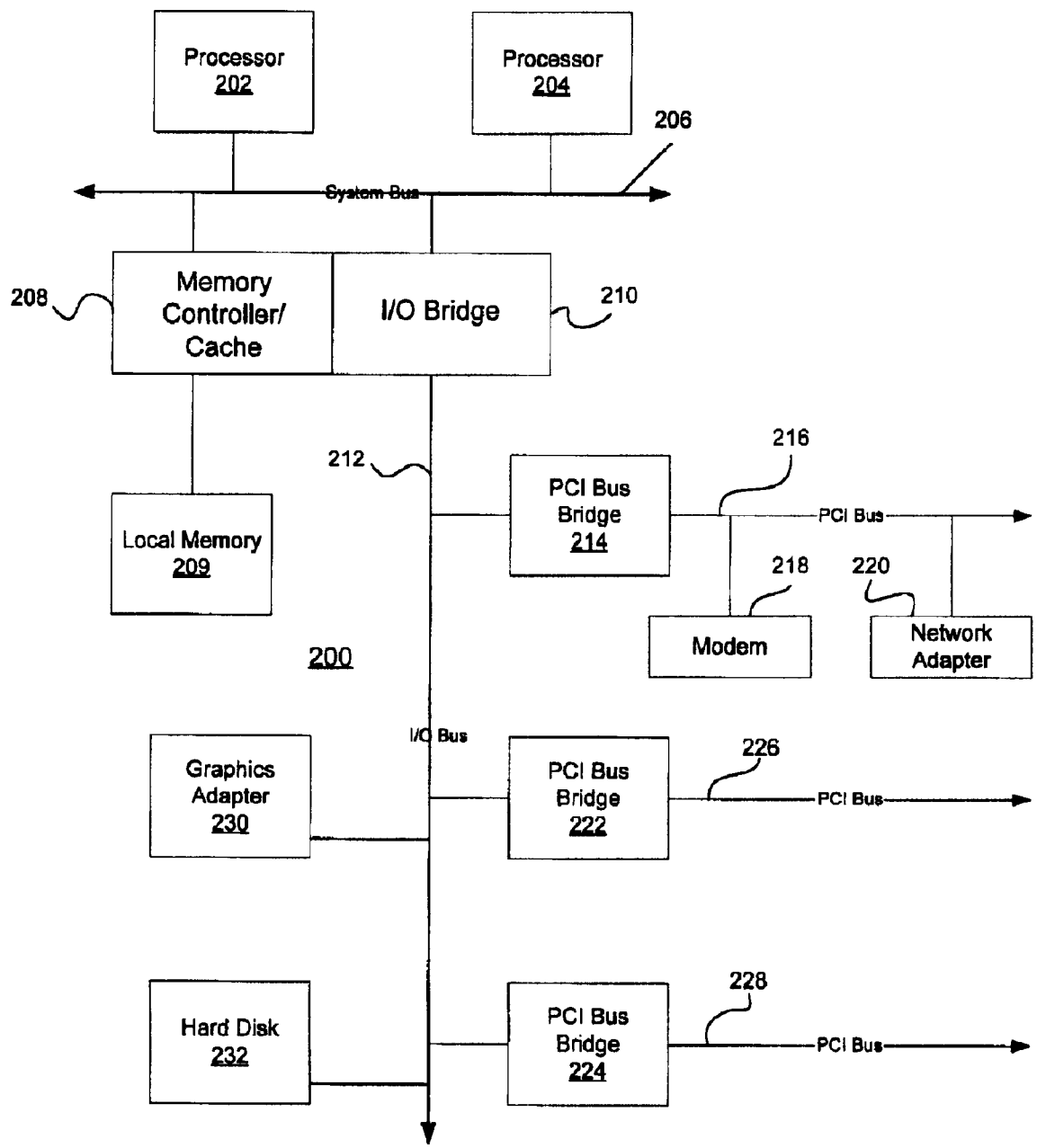
FIG. 2 is a block diagram depicting a data processing system that may be implemented as a server.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
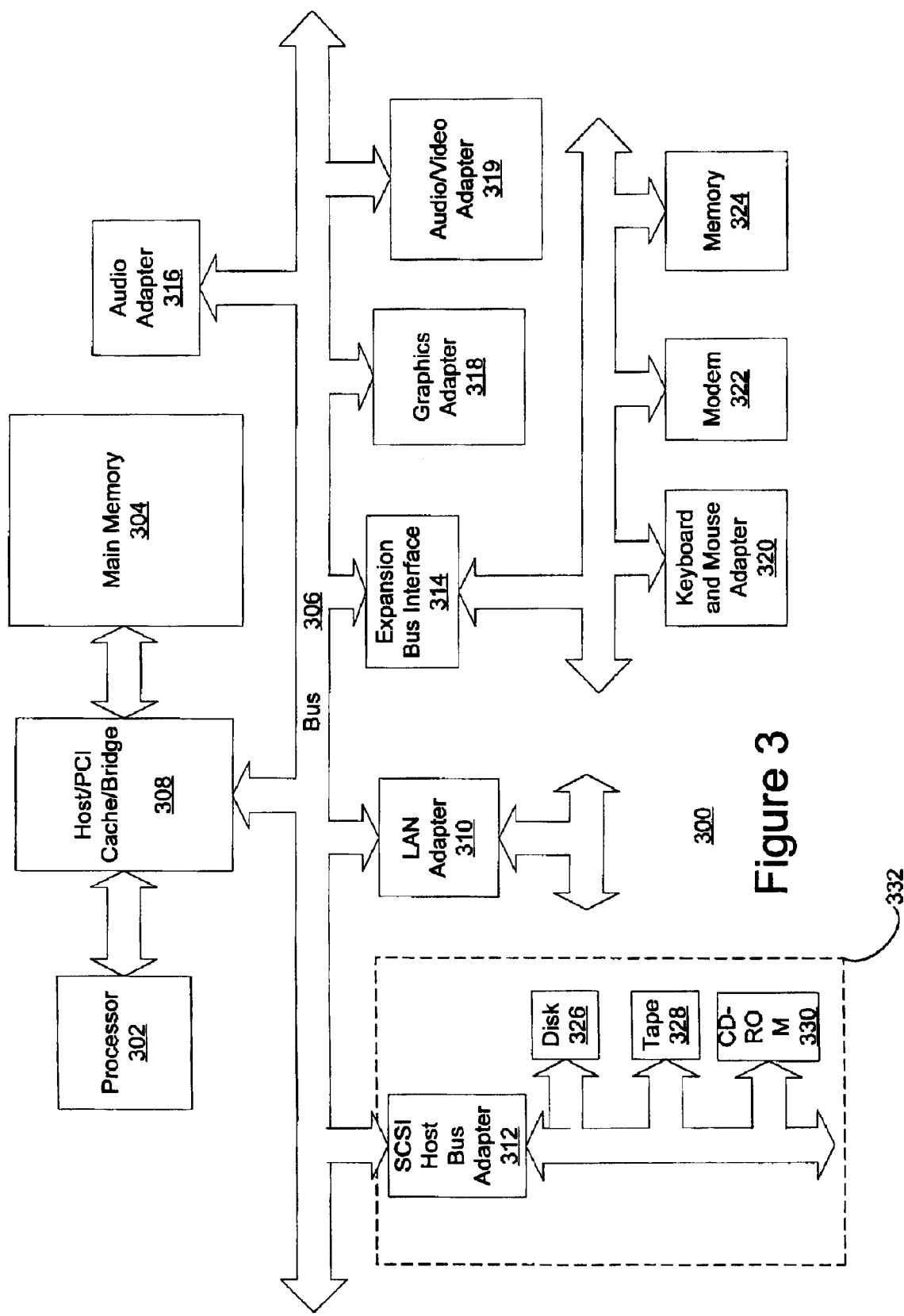
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method and system for user-specific management of applications in a heterogeneous server environment. The invention depends on a package being defined at the server that contains the set of changes captured through usage of a "diff" type utility during the installation of a given application. This set of changes forms a package of application file changes, system file changes, system registry changes, and user registry changes.

An API (such as Net32UserAppAdd) or other means is used to assign the application to a given user for execution from the heterogeneous server. The API takes advantage of a desktop that has been assigned to the user and is defined by the Windows user profile that is unique to the user and available from the server. To provide a convenient means to track the applications assigned to the user, an entry is added to a file (such as usrstore.ini) such that the application is known to have been added to this user.

To enable the user to access the application conveniently, the standard icons that signify and provide access to an application are added to the users desktop. For Windows, this is accomplished through addition of the necessary links to the Windows User Profile for the given user. In addition, shortcuts are added to locations such as the Windows Start Menu. This information is contained in the application package that was previously defined on the server.

Since the application files reside on the heterogeneous server, the user must be given access to the files so that when they roam to workstations in the network they are able to access the files contained on this centralized server. This can be accomplished through means such as assignment in a logon assignment or persistent connection to the user's information stored at the server.

By using this means, each time a user authenticates to the server, the user will be provided access to the application files automatically as part of the authentication process.

For Windows applications, there are normally a set of unique user registry changes in the Windows registry for the application. This invention addresses these client-side changes by creating of a batch file or another appropriate type of file that can be executed as part of the authentication process. When this file is executed, the necessary changes are made to the user registry to enable the execution of the application.

Figure 4:
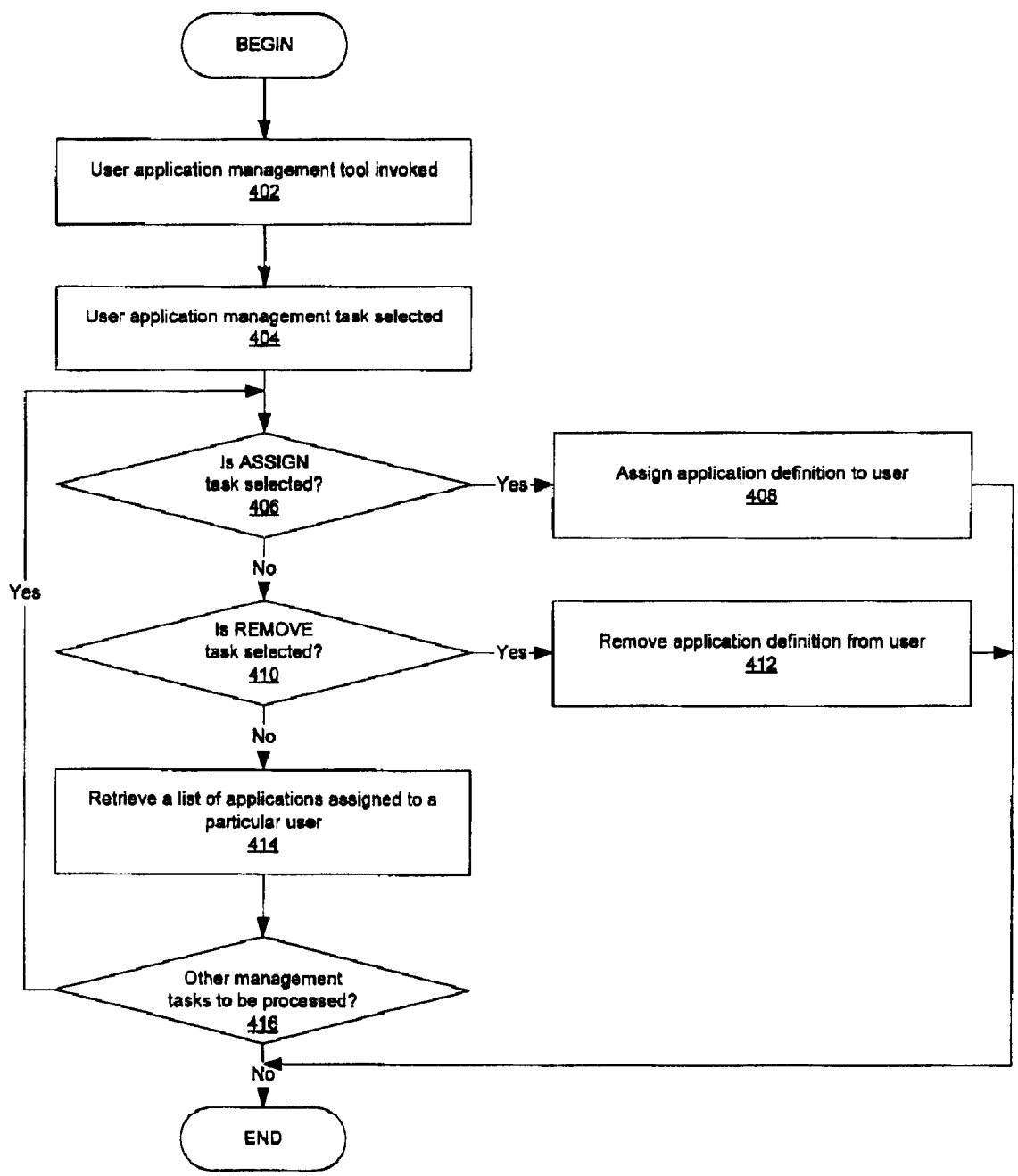
FIG. 4 is a flowchart depicting a process for managing Windows-based applications for users in a heterogeneous server environment.

With reference now to FIG. 4, a flowchart depicts a process for managing Windows-based applications for users in a heterogeneous server environment. Using a user application management tool, applications may be managed at a user level to determine the applications to which a user has access. The user application management tool may be implemented such that it ensures that the user of the tool has the proper authority for determining user access to applications, such as a system administrator. The tool may also ensure that various software services are available on the local machine, etc.

The process begins when the user-application management tool is invoked (step 402). Using the tool, a user with administrative authority has the ability to choose a variety of user-application management tasks. The administrator specifies a particular user for which applications are to be managed and then selects a task to be performed by the tool (step 404). For example, the administrator can select an application to be assigned to the previously specified user or to be removed from the user. A determination is then made as to whether the "assigned" task has been selected (step 406). If so, an application definition is assigned to the user (step 408). The assignment process is described in greater detail further below in FIGS. 5A–5B.

The process then branches to see if other tasks should be processed. If the "assigned" task has not been selected, then a determination is made as to whether the "removed" task has been selected (step 410). If so, an application definition is removed for the user (step 412). The removal process is described in greater detail further below in FIGS. 6A–6B.

The process then branches to determine whether other management tasks should be processed. If the "removed" task has not been selected, then a list of all applications assigned to a particular user is retrieved as the default task to be performed (step 414). The retrieval process is described in greater detail further below in FIG. 7.

A determination is then made as to whether other management tasks should be processed (step 416). If so, then the process loops back to step 406 to process another task. If not, then the process terminates. In this manner, the user-application management tool executes an essentially non-terminating event loop until the user of the tool requests to quit or exit the tool.

Figure 5A:
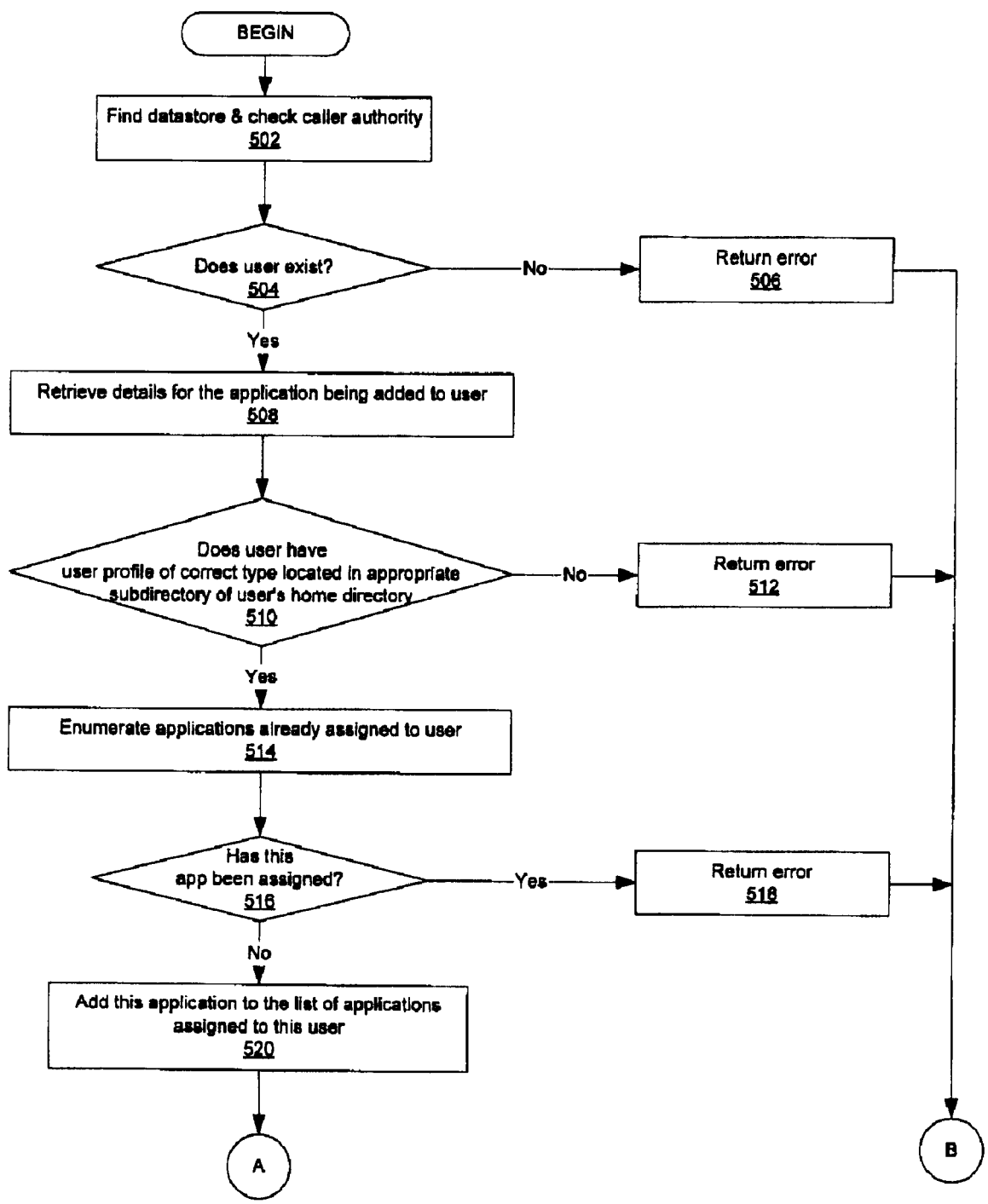
FIGS. 5A–5B are a flowchart depicting a process for assigning an application definition to a user.
Figure 5B:
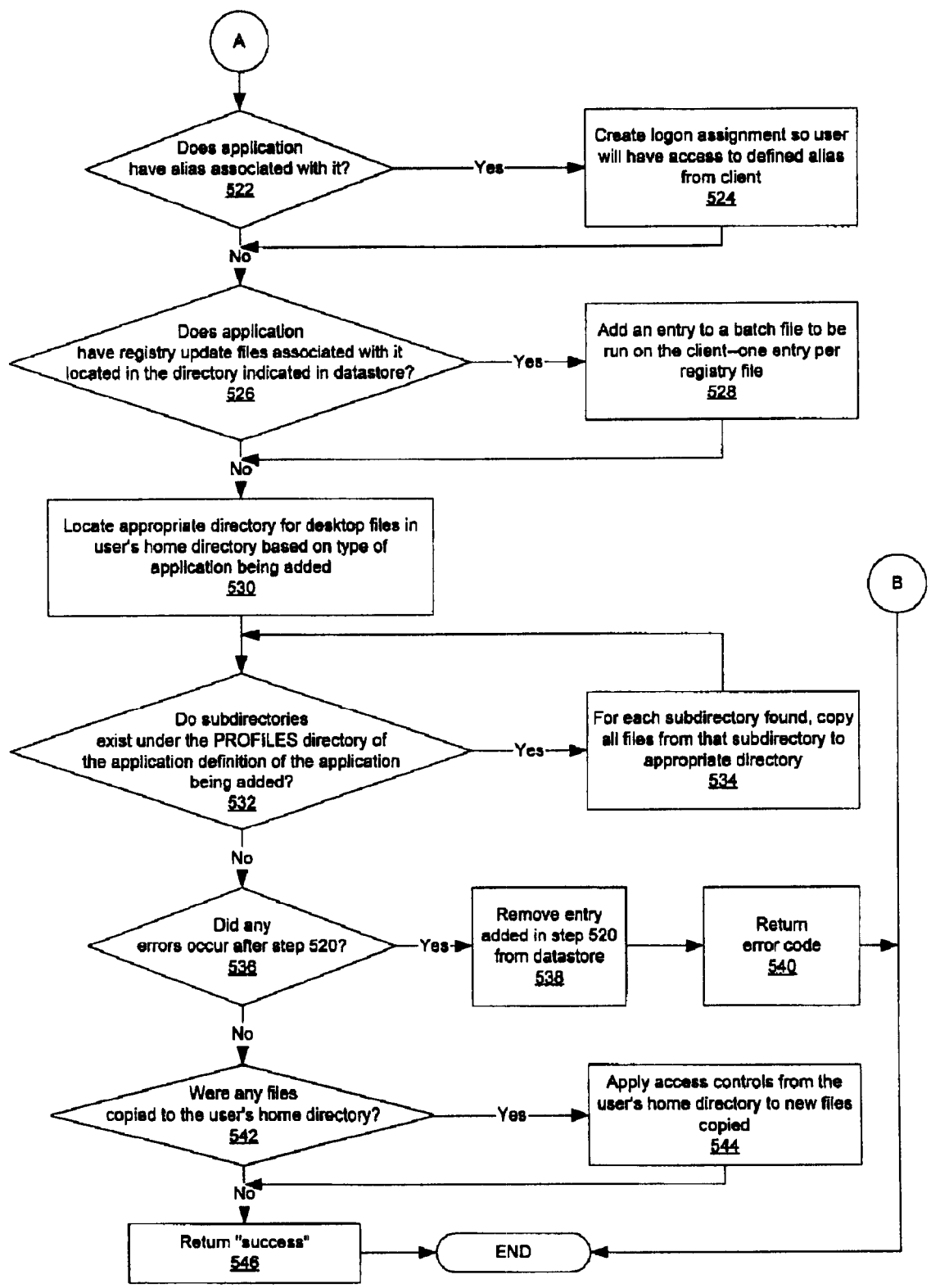

With reference now to FIGS. 5A–5B, a flowchart depicts a process for assigning an application definition to a user. FIGS. 5A–5B shows the process used by an application program interface (API) that may be invoked by a user-application management tool. The user ID, the identifier of an application, and the "type" of operating system for the application are passed in as parameters to the API. The process begins by resolving a path to the datastore and verifying or authenticating the authority of the caller of the API (step 502). The verification process is described in greater detail further below in FIG. 8.

A determination is then made as to whether the specified user exists (step 504). Platform-specific methods are used to determine the existence of the user to whom an application is to be assigned. If the user does not exist, then an error code is returned and the process terminates (step 506). If the user exists, details for the application to be assigned to the user are retrieved (step 508).

A determination is then made as to whether the user has a user profile of the correct type located in the appropriate subdirectory of the user's home directory (step 510). If not, then an error code is returned and the process terminates (step 512). In order to determine whether the proper user profile exists, a path to the user's home directory is constructed. If a restricted desktop type of the previously selected operating system type has been created for the user, specific subdirectories will exist in the user's home directory as there may be one subdirectory per application type. The specific subdirectory is then searched for a user profile, and if the profile is located, then the processing may continue.

A list of applications already assigned to a user are then enumerated by opening and reading the datastore (step 514). A determination is then made as to whether the requested application identified in a parameter passed into the API has previously been assigned to the user (step 516). If so, then an error code is returned and the process terminates (step 518). If the application has not been found in the list, the application is added to the list of applications assigned to the user, and the updated list is written to the datastore (step 520).

A determination is then made as to whether the application has an associated alias (step 522). To do so, the server may be queried to determine whether the directory in which the application definition resides has been shared. If so, then a "logon assignment" is created for the user such that, at logon time, a connection is automatically made to the shared resource on which the application definition resides (step 524). In other words, the user will have access to the defined alias from the client upon logon. Once the logon assignment is created, or if there is no associated alias, a determination is then made as to whether the application has a registry update file associated with it located in the directory indicated in the datastore (step 526). In other words, the directory in which the application definition resides is searched for one or more registry update files that contain information about updates that must be made to the client-side registry.

If one or more files are found, then an entry is added to a batch file that is to be run on the client at logon time to cause updates to the client's registry (step 528). A "RUNDLL" statement is added to the batch file per registry update file. Once the batch file is created, or if there are no associated registry update files, then the name of a "target" directory on a server is resolved (step 530). The target directory is a subdirectory of the user's home directory which was previously resolved in step 510. In other words, the appropriate directory for the desktop files are located in the user's home directory based on the type of the application being added. A determination is then made as to whether subdirectories exist under the \PROFILES directory of the application definition of the application being added (step 532). If subdirectories are found, a loop is entered such that, for each subdirectory, all of the files and subdirectories are recursively copied into the "target" directory located in step 530 (step 534). If no subdirectories exist or no other subdirectories need to be processed, then a determination is made as to whether any errors have occurred in the processing of the attempt to add the application from step 520 through step 534 (step 536). If so, then the entry added previously in step 520 is removed from the datastore (step 538). An error code is then returned and the process terminates (step 540).

If there were no previous errors, then a determination is made as to whether any files have been copied to the user's home directory (step 542). If so, platform-specific methods are used to ensure that the user has access to the files and subdirectories that were copied to the home directory of the user (step 544). Once the access controls have been applied, or if there were no files copied, then a successful return code is returned and the process terminates (step 546).

Figure 6A:
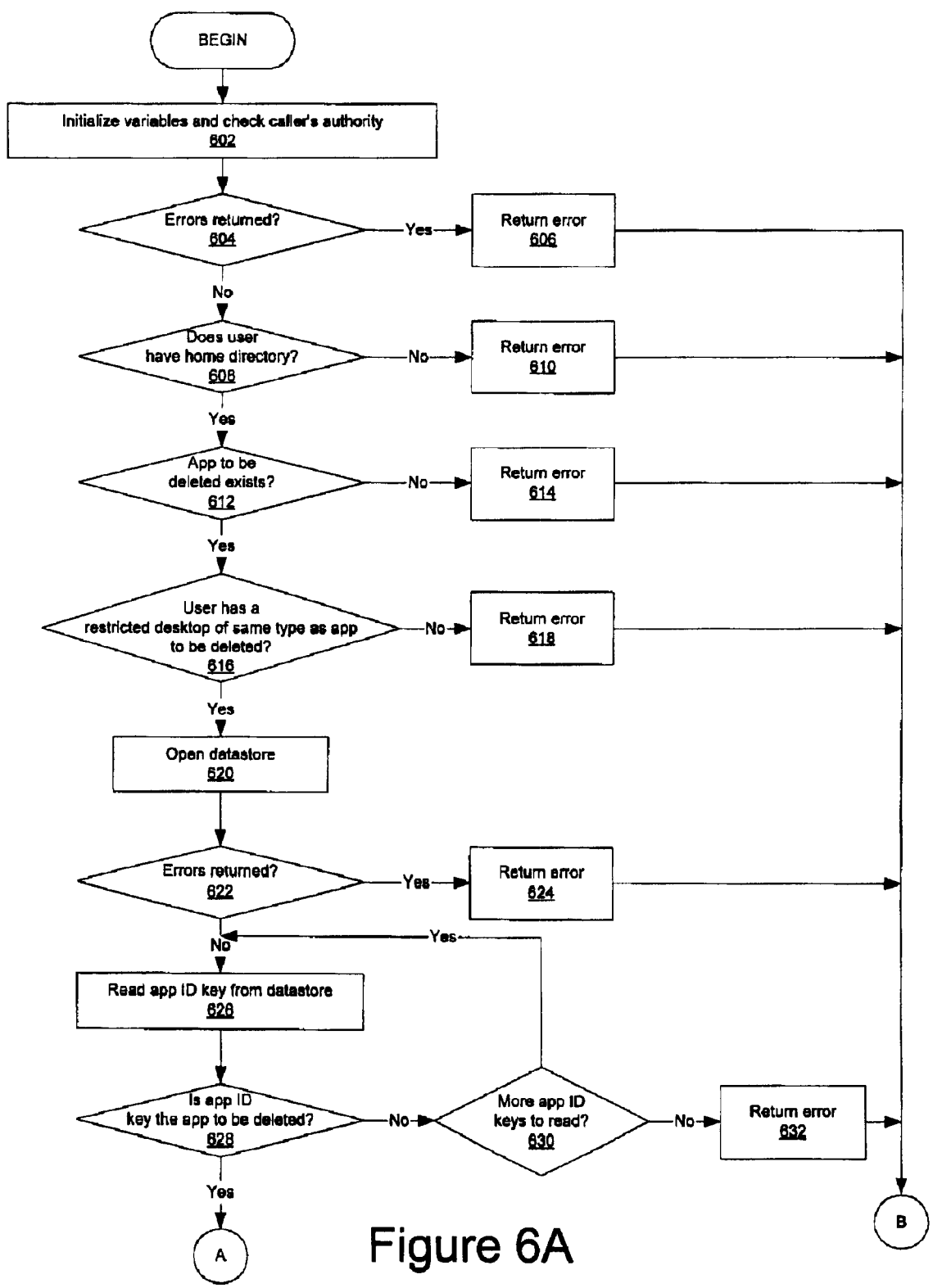
FIGS. 6A–6B are a flowchart depicting a process for removing an application definition from a user.
Figure 6B:
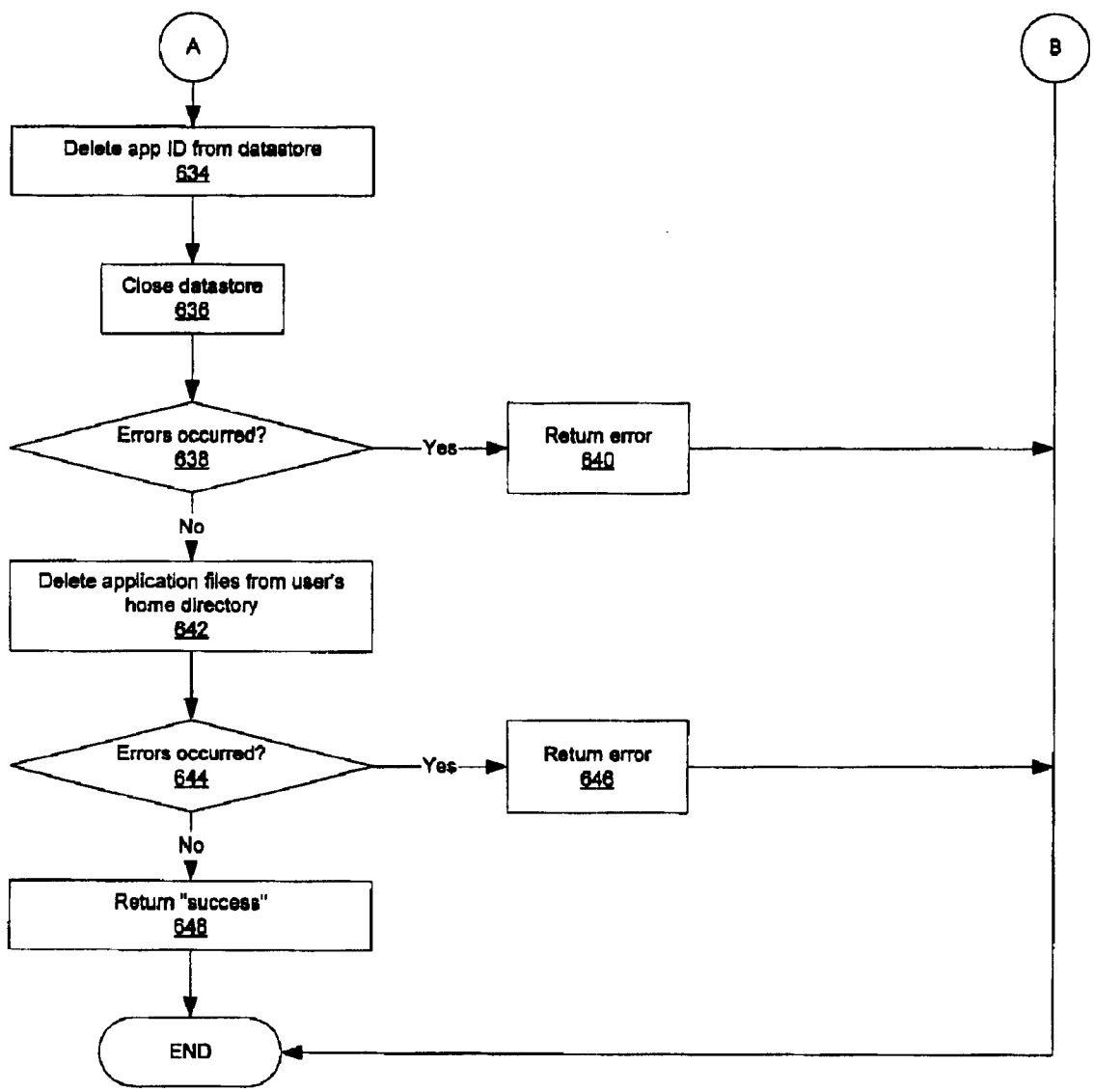

With reference now to FIGS. 6A–6B, a flowchart depicts a process for removing an application definition from a user. FIGS. 6A–6B show the processing that may be done by an API invoked by an application management tool. The user ID and the identifier for the application to be removed are passed in as API parameters. The process begins by resolving the path to the datastore and verifying the authority of the API caller (step 602). The verification process is described in greater detail further below in FIG. 8.

A determination is then made as to whether any errors are generated (step 604). If so, then an error code is returned and the process terminates (step 606). If there are no errors generated, then a determination is made as to whether the specified user has a home directory (step 608). If not, then an error code is returned and the process terminates (step 610). If no errors are generated, then a determination is made as to whether the application specified as the parameter to the API exists (step 612). If not, then an error code is returned and the process terminates (step 614).

If no errors are generated, then a determination is made as to whether the user has a restricted desktop of the same type as the application to be deleted (step 616). If not, then an error code is returned and the process terminates (step 618). The datastore is opened (step 620), and a determination is made as to whether any errors have been returned (step 622). If so, then an error code is returned and the process terminates (step 624). All of the applications associated with the user identifier are read from the datastore (step 626), and a determination is made as to whether the identifier for the application that is to be removed is present in the list of applications read from the datastore (step 628). If not, then a determination is made as to whether there are any other application IDs in the list of applications read from the datastore (step 630). If so, then the process loops back to step 626 to check for the application to be removed. If not, then an error code is returned and the process terminates (step 632). Once the application is found, then the application identifier is removed from the list of applications and the modified list is written back to the datastore (step 634). The deletion process is described in greater detail further below in FIG. 9.

The datastore is then closed (step 636). If any errors are generated (step 638), then an error code is returned and the process terminates (step 640). If no errors are generated, then all application-related files are deleted from the user's home directory (step 642). A determination is then made as to whether any errors have been generated (step 644), and if so, an error code is returned and the process terminates (step 646). If no errors have been generated, a successful return code is returned and the process terminates (step 648).

Figure 7:
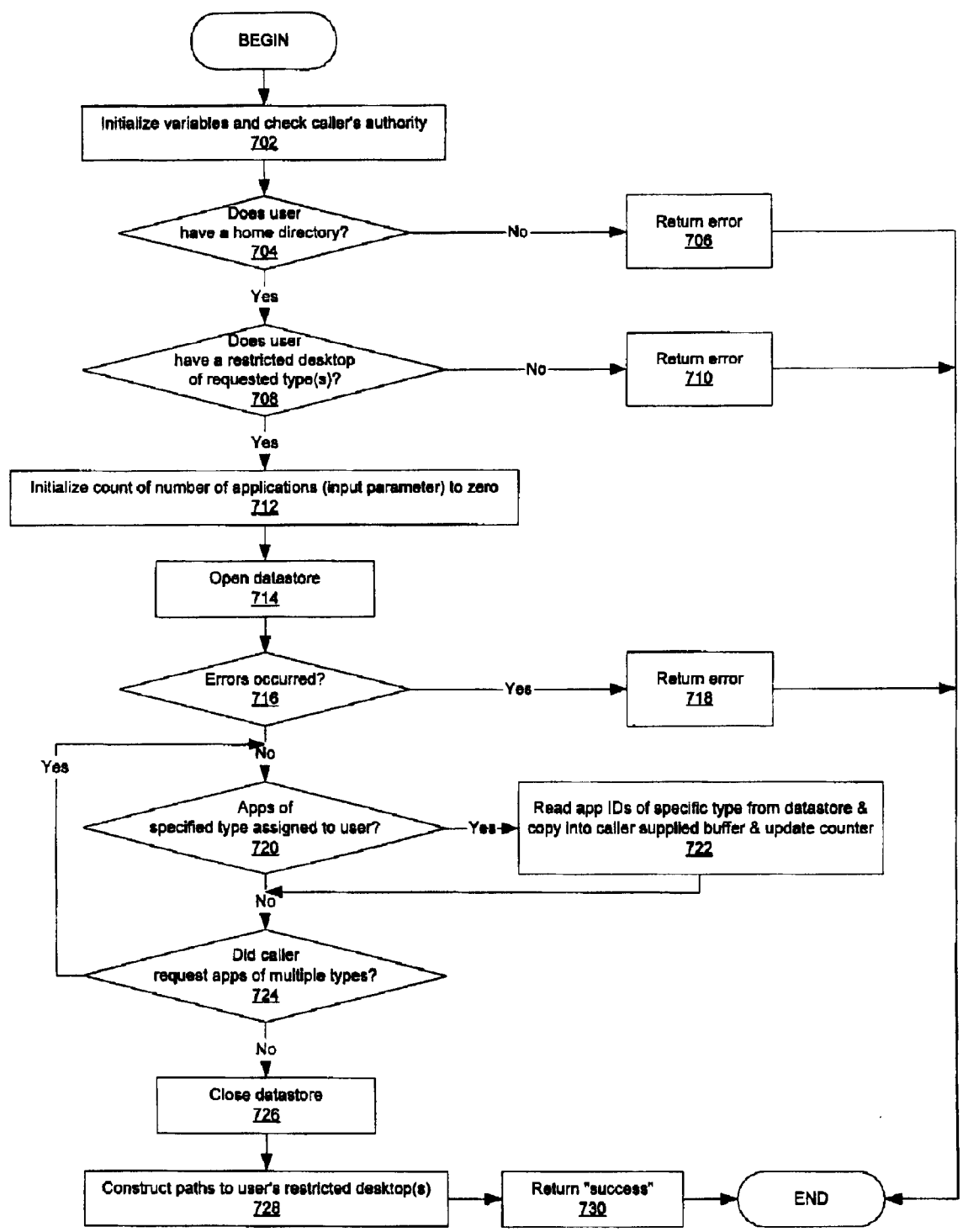
FIG. 7 is a flowchart depicting a process for retrieving a list of applications assigned to a particular user.

With reference now to FIG. 7, a flowchart depicts a process for retrieving a list of applications assigned to a particular user. FIG. 7 describes a process that may be found in an API that is invoked by a user-application management tool. Several parameters may be passed into the API, including: an identifier for the user to which applications are assigned; the type or types of applications to be retrieved in terms of the operating system upon which the applications may execute; a pointer to a buffer allocated by the caller of the API that will hold the list of applications; a pointer to an integer for returning the number of items in the buffer; and pointers to buffers where the paths to the desktops are returned. The process begins by resolving the path to the datastore and verifying the authority of the API caller (step 702). The verification process is described in greater detail further below in FIG. 8. The path to the user's home directory is resolved (step 704), and if an error is generated, then an error code is returned and the process terminates (step 706).

A determination is then made as to whether the user has a restricted desktop of the type requested as a parameter to the API call (step 708). If not, then an error code is returned and the process terminates (step 710). If the proper restricted desktop paths exist for each application requested, then the "count" input parameter is initialized to zero (step 712). The datastore is opened (step 714), and a determination is made as to whether any errors have occurred (step 716). If so, then an error code is returned and the process terminates (step 718). If no errors were generated, then the datastore is searched for applications of the specified type that are assigned to the user (step 720). If applications of the requested type are found, they are read from the datastore and copied into the caller-supplied buffer, and the "count" parameter is updated to reflect the number of items copied into the buffer (step 722). Once the application information is placed into the buffer, or if no applications of the specified type for the user were found, a determination is then made to check if more than one type of application was requested (step 724). If so, then the process loops back to step 720. If not, then the datastore is closed (step 726). Paths are then constructed to the user's restricted desktops, and the paths are copied into the caller-allocated buffer (step 728). A successful return code is then returned and the process terminates (step 730).

Figure 8:
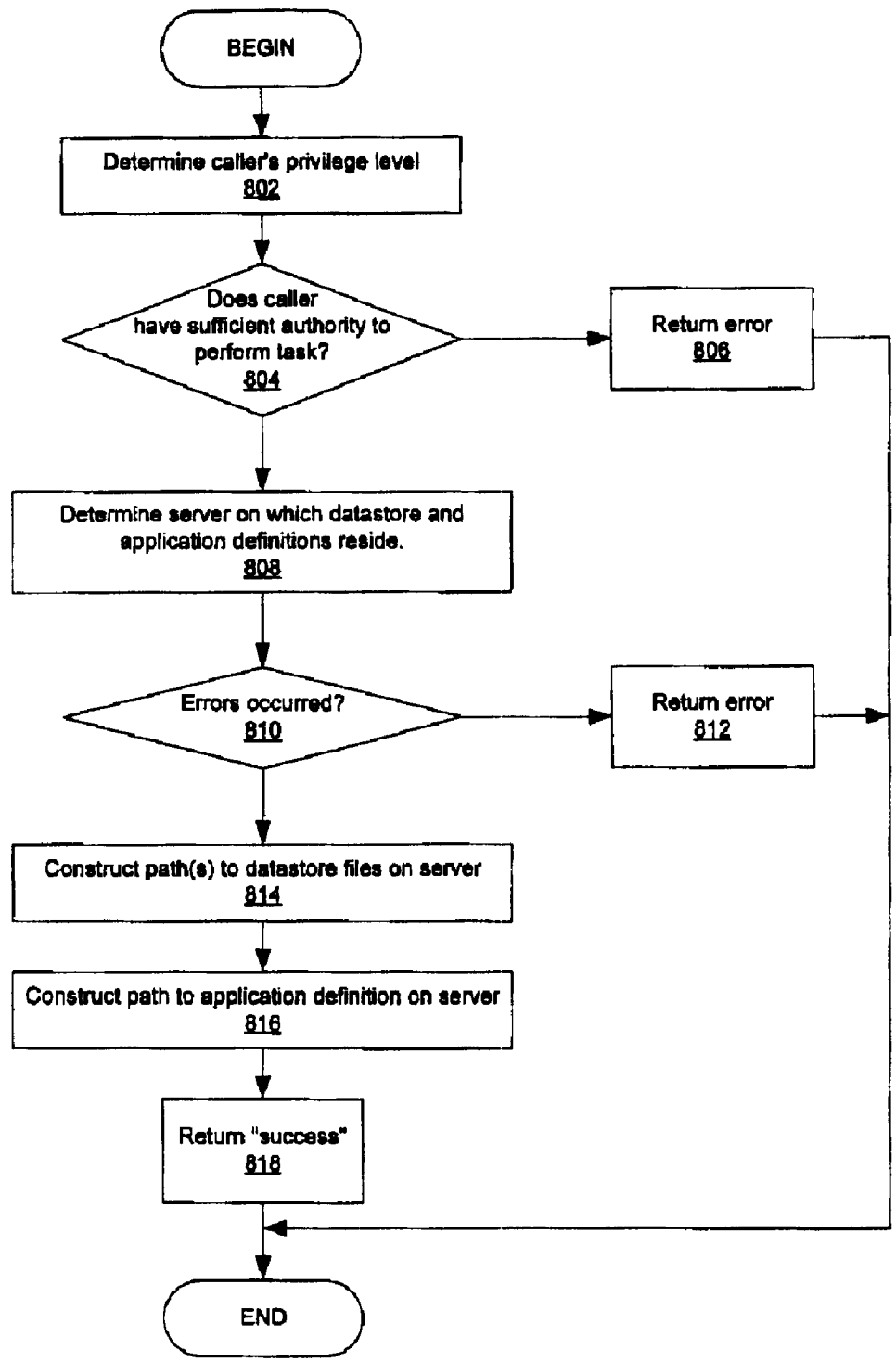
FIG. 8 is the flowchart depicting a process for initializing variables and checking or verifying the authority of the caller of a variety of APIs in conjunction with user-application management.

With reference now to FIG. 8, the flowchart depicts a process for initializing variables and checking or verifying the authority of the caller of a variety of APIs in conjunction with user-application management. The process begins by using platform-specific methods to determine the privilege level of the caller of the API (step 802). A determination is made as to whether the caller has sufficient authority to perform the task of the API (step 804). If not, then an error code is returned and the process terminates (step 806). If the caller has administrative privileges, then the server on which the datastore files and application definitions reside is determined (step 808). Typically, the "primary" server in the LAN is the determined server. A determination is made as to whether any errors are generated (step 810), and if so, an error code is returned and the process terminates (step 812). If no errors have been generated, paths are constructed to the datastore files on the server (step 814). A path is also constructed to the application definitions on the server (step 816). If no errors occur during the construction of the paths, then a successful return code is returned and the process terminates (step 818).

Figure 9:
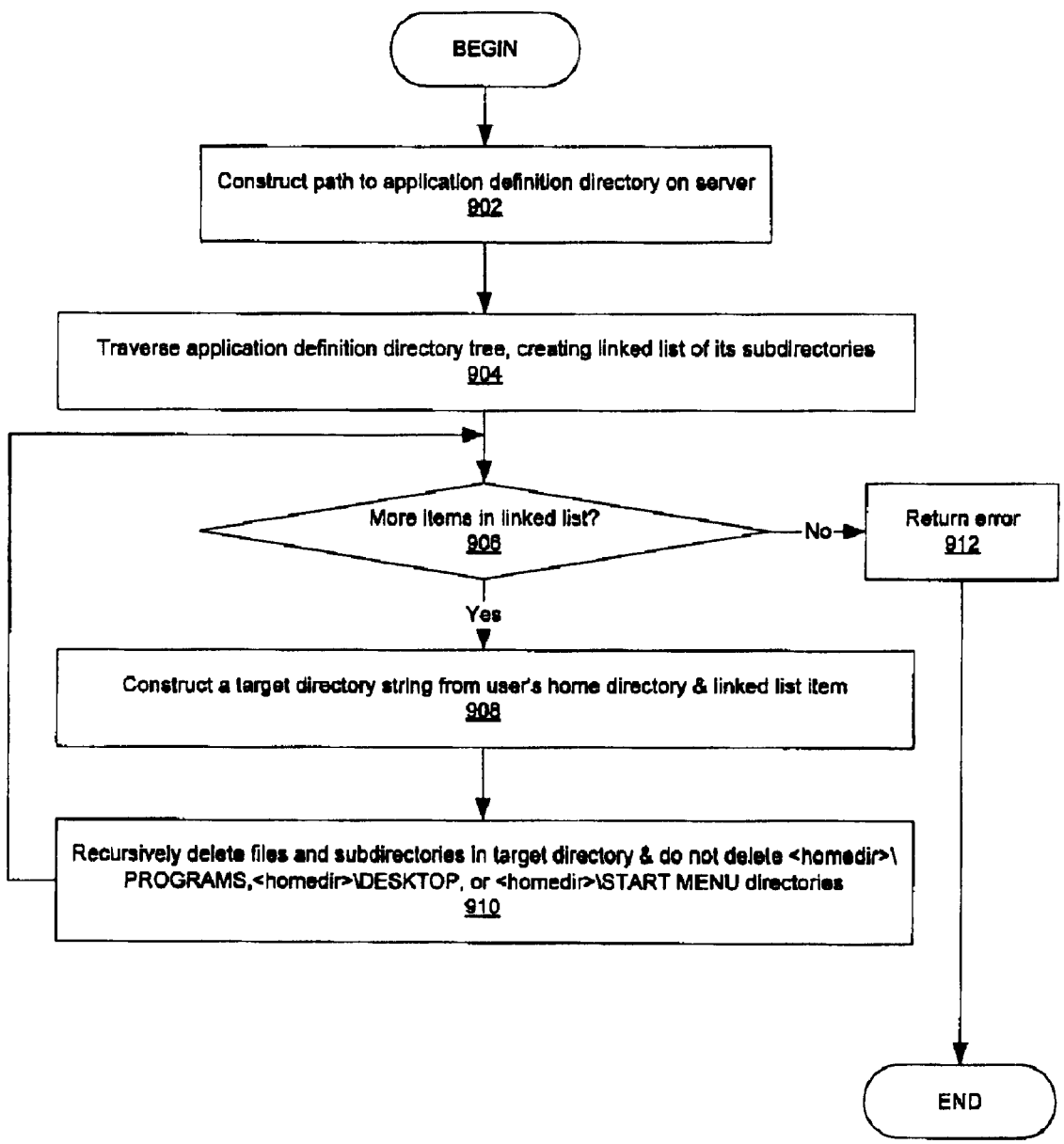
FIG. 9 is a flowchart depicting a process for deleting application-related files from a user's home directory.

With reference now to FIG. 9, a flowchart depicts a process for deleting application-related files from a user's home directory. The process begins by constructing a path to the application definition directory on the server (step 902). The application definition directory is traversed, and any subdirectories found are added to a linked list of subdirectories (step 904). A determination is made as to whether there are any items in the linked list by examining the nodes of the linked list to determine whether or not they equal NULL (step 906). If the linked list is not empty, then a "target" directory string is constructed by appending the node directory to the user's home directory path (step 908).

The newly constructed path is then traversed, and all of the files and subdirectories found in the path are deleted except for certain directories. The directories represented by <homedirectory>\PROGRAMS, <homedirectory>\DESKTOP, and <homedirectory>\START_MENU are not deleted (step 910). The process then loops back to step 906 to determine whether there are any other items in the linked list to be processed by deleting files and directories. If an error occurs during the file or directory deletion, a flag may be set, and the loop may continue in order to delete as many files and directories as possible. If the flag is set by the time that the linked list has been completely processed, then a warning return code may be returned to the caller indicating that not all files or directories have been deleted. If no errors occur, a successful return code may be returned to the caller (step 912). Otherwise, an appropriate error code is returned.

Figure 10:
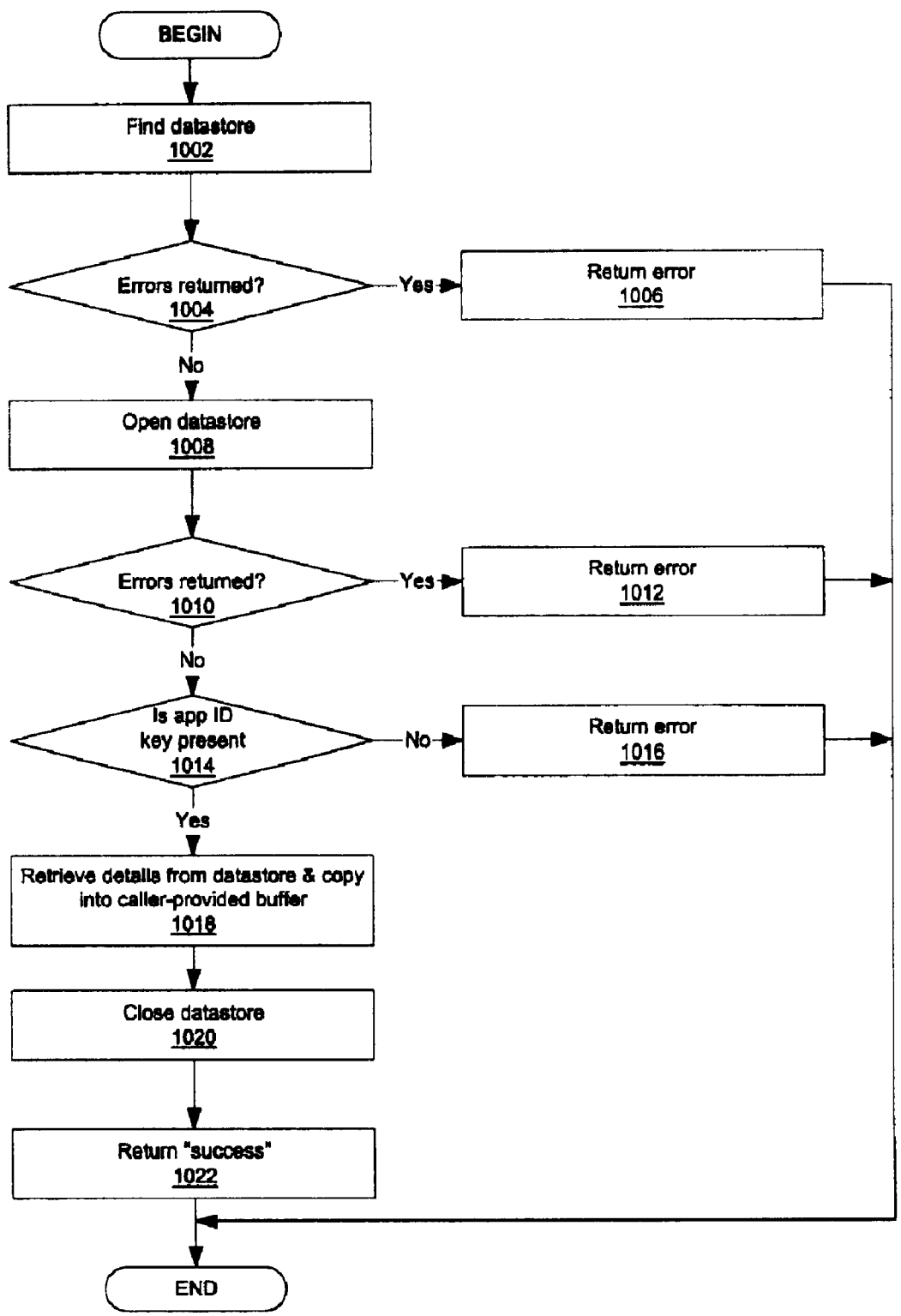
FIG. 10 is a flowchart depicting a process for retrieving details for a specific application.

With reference now to FIG. 10, a flowchart depicts a process for retrieving details for a specific application. The application identifier of the application whose details are to be retrieved and a pointer to a buffer into which the application's details are to be formatted and copied are passed into the API by the caller as parameters to the API. The process begins by resolving the path to a datastore containing the application definition and validating the authority of the API caller (step 1002). A determination is then made as to whether an error has been generated by the previous step (step 1004), and if so, then the error is returned to the caller and the process terminates (step 1006). If no error has been generated, then the datastore is opened with read access privileges (step 1008).

A determination is then made as to whether an error has been generated by the previous step (step 1010), and if so, then an error is returned to the caller and the process terminates (step 1012). If no error has been generated, a determination is made as to whether the application definition already exists in the datastore (step 1014). If not, an error code is returned to the caller and the process terminates (step 1016). If the application definition does exist, then the details about the application are retrieved from the datastore and copied into the buffer provided by the caller (step 1018). The datastore is then closed (step 1020), and the process terminates by returning a successful completion code to the caller (step 1022).

Figure 11:
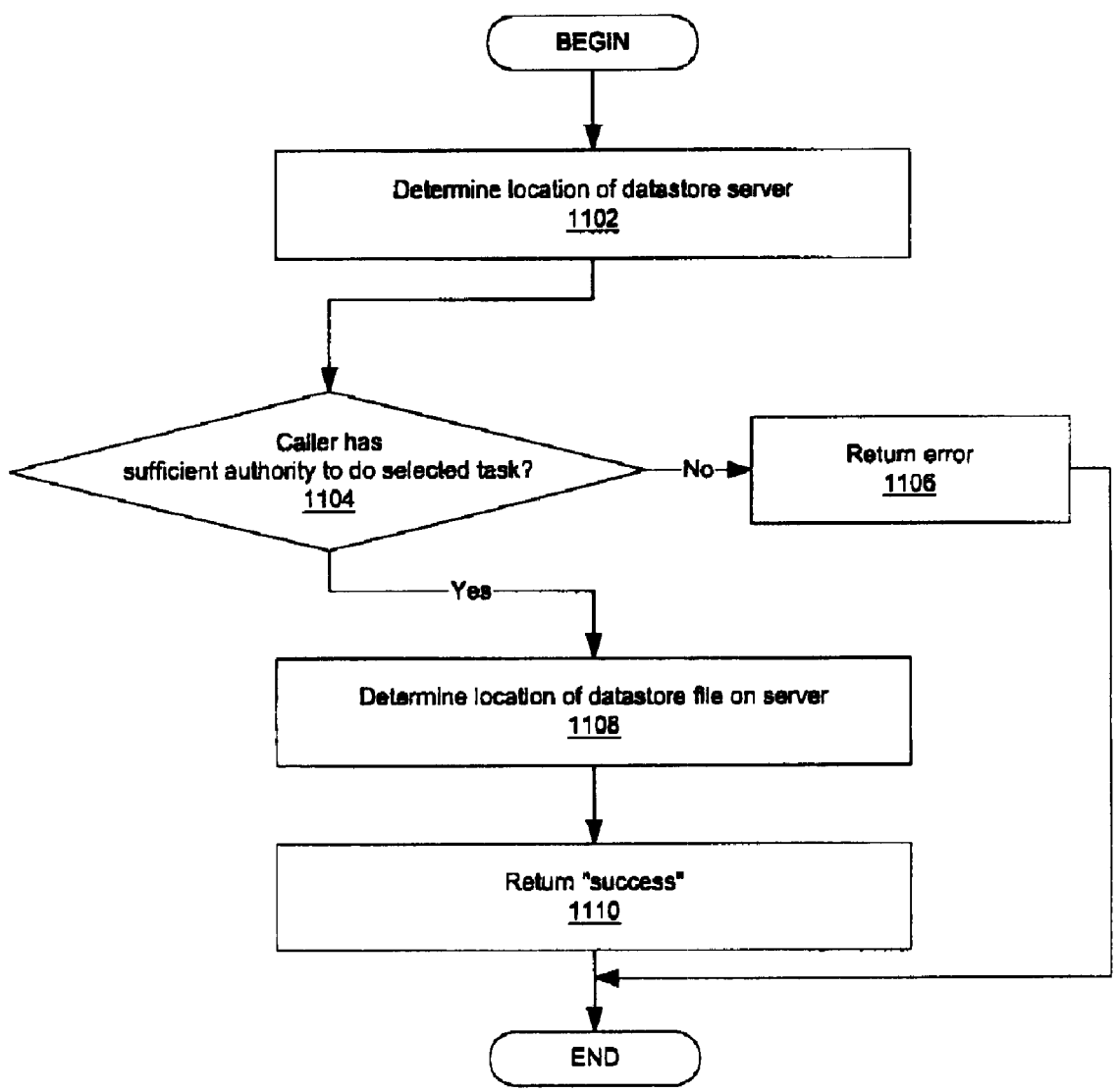
FIG. 11 is a flowchart depicting a process that is used to locate a datastore and to authenticate a caller within various APIs invoked by a management tool.

With reference now to FIG. 11, a flowchart depicts a process that is used to locate a datastore and to authenticate a caller within various APIs invoked by a management tool. The process begins by determining the appropriate server on which the datastore resides (step 1102). A determination is then made as to whether the caller to the application management API has sufficient authority to do the selected task (step 1104). If not, then an error code is returned to the caller and the process terminates (step 1106). If the caller has the appropriate authority to do the selected task, then the location of the datastore on the server is determined (step 1108). A successful return code is then returned to the caller (step 1110).

Figure 12:
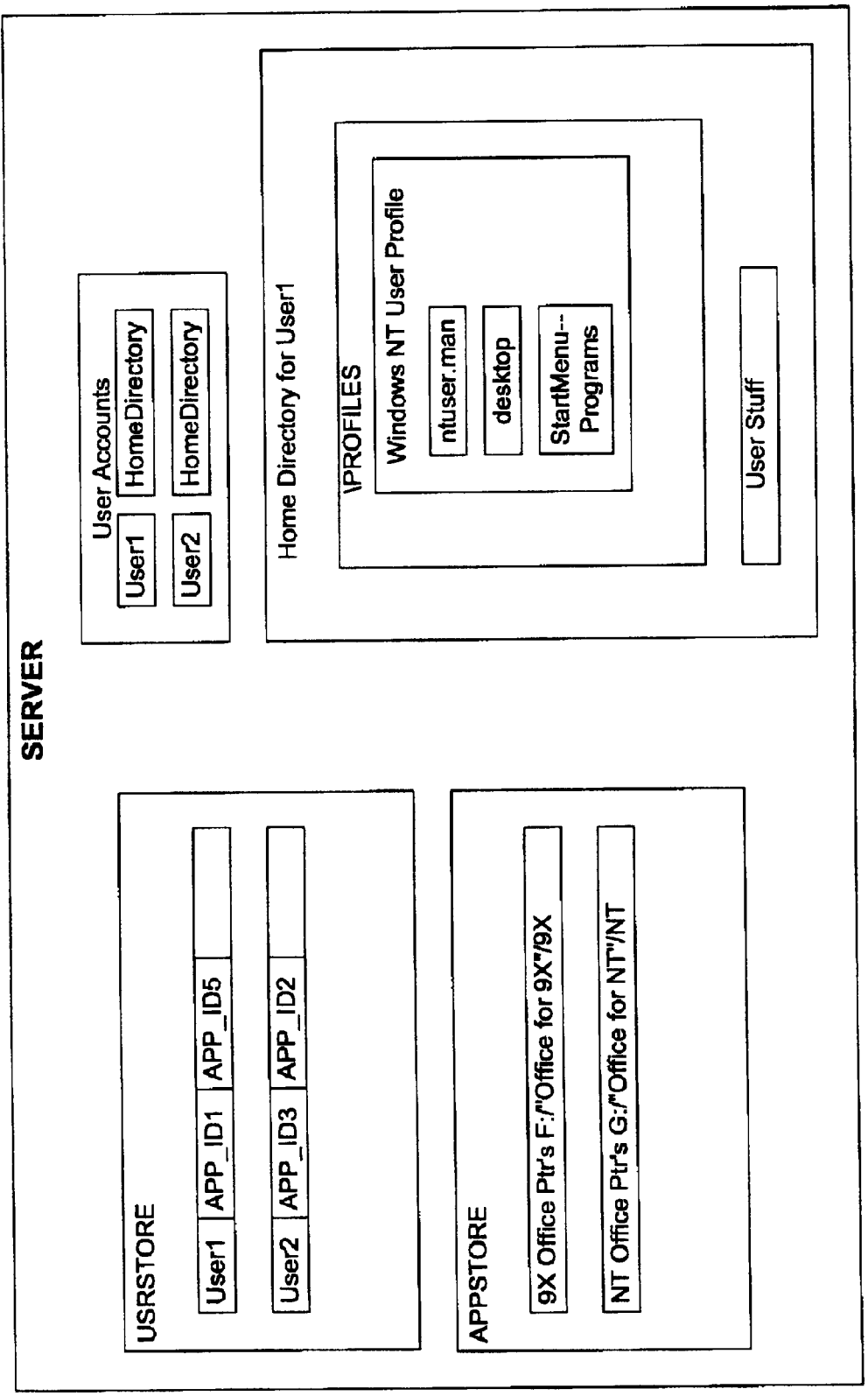
FIG. 12 is a block diagram depicting the directory structure for storing the user-specific information.

With reference now to FIG. 12, a block diagram depicts the directory structure for storing the user-specific information.

The advantages of the present invention should be apparent in light of the detailed description of the invention provided above. An advantage is achieved through the integration of application-specific information stored at a centralized server location with the unique user-specific desktop information maintained in the user profile. This is all done in a heterogeneous server environment which enables an administrator to totally control the Windows-based applications available to end-users of the server.

Another advantage of this invention is the granular level of control an administrator has when assigning applications to users. In addition, the invention supports the ability to personalize the desktop provided to the given user such that it contains the entries necessary to execute the given application. Finally, the invention supports the general advantage of supporting a much larger set of server platforms that can now be utilized to manage networks of Windows clients executing Win32 API based applications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing configuration information for a data processing system, the method comprising the computer-implemented steps of:

selecting a user;

selecting an application; and associatively storing a user-application definition linking the selected user and the selected application with applications files for the selected application in a datastore on a heterogeneous server, wherein the user-application definition is used to configure the a client for executing the application.

2. The method of claim 1, wherein the user-application definition provides manageability of an application for a user of a Windows-based data processing system from a non-Windows-based server.

3. The method of claim 1 further comprising:

associatively storing an application package with the user-application definition, wherein the application package comprises user files, system files, user registries, or system registries that are used to configure a client for executing the application.

4. The method of claim 1, wherein the heterogeneous server is a non-Windows-based server.

5. The method of claim 1 further comprising:

managing access rights for accessibility to Windows-based applications on a non-Windows-based server.

6. The method of claim 5, wherein a Windows-based application may be a Windows 95 application, a Windows 98 application, or a Windows NT application.

7. The method of claim 1 further comprising:

serving a Windows-based application specified by the user-application definition in the datastore from a non-Windows-based server to a Windows-based client.

8. The method of claim 1 further comprising:

enumerating application information for all user-application definitions stored in the datastore for the selected user.

9. A method for managing configuration information for a data processing system, the method comprising the computer-implemented steps of:

selecting a user;

selecting a Windows-based application; and associatively storing a user-application definition linking the selected user and the selected application with applications files for the selected application in a datastore on a non-Windows-based server, wherein the user-application definition provides manageability of an application for a user of a Windows-based data processing system from the non-Windows-based server, wherein the user-application definition is used to configure the a client for executing the application.

10. An apparatus for managing configuration information for a data processing system, the apparatus comprising:

first selecting means for selecting a user;

second selecting means for selecting an application; and storing means for associatively storing a user-application definition linking the selected user and the selected application with applications files for the selected application in a datastore on a heterogeneous server, wherein the user-application definition is used to configure the a client for executing the application.

11. The apparatus of claim 10, wherein the user-application definition provides manageability of an application for a user of a Windows-based data processing system from a non-Windows-based server.

12. The apparatus of claim 10 further comprising:

second storing means for associatively storing an application package with the user-application definition, wherein the application package comprises user files, system files, user registries, or system registries that are used to configure a client for executing the application.

13. The apparatus of claim 10, wherein the heterogeneous server is a non-Windows-based server.

14. The apparatus of claim 10 further comprising:

managing means for managing access rights for accessibility to Windows-based applications on a non-Windows-based server.

15. The apparatus of claim 14, wherein a Windows-based application may be a Windows 95 application, a Windows 98 application, or a Windows NT application.

16. The apparatus of claim 10 further comprising:

serving means for serving a Windows-based application specified by the user-application definition in the datastore from a non-Windows-based server to a Windows-based client.

17. The apparatus of claim 10 further comprising:

enumerating means for enumerating application information for all user-application definitions stored in the datastore for the selected user.

18. A computer program product on a computer-readable medium for managing configuration information for a data processing system, the computer program product comprising:

first instructions for selecting a user;

second instructions for selecting a Windows-based application; and third instructions for associatively storing a user-application definition linking the selected user and the selected application with applications files for the selected application in a datastore on a non-Windows-based server, wherein the user-application definition provides manageability of an application for a user of a Windows-based data processing system from the non-Windows-based server, wherein the user-application definition is used to configure the a client for executing the application.

19. A computer program product on a computer-readable medium for managing configuration information for a data processing system, the computer program product comprising:

first instructions for selecting a user;

second instructions for selecting an application; and third instructions for associatively storing a user-application definition linking the selected user and the selected application with applications files for the selected application in a datastore on a heterogeneous server, wherein the user-application definition is used to configure the a client for executing the application.

* * * * *